UNITED STATES PATENT OFFICE.

ERASTUS C. NOLAND, OF CRAWFORDSVILLE, INDIANA.

INCRUSTATION-PREVENTIVE.

SPECIFICATION forming part of Letters Patent No. 419,470, dated January 14, 1890.

Application filed February 15, 1889. Serial No. 300,058. (No specimens.)

*To all whom it may concern:*

Be it known that I, ERASTUS C. NOLAND, a citizen of the United States, residing at Crawfordsville, in the county of Montgomery and State of Indiana, have invented a new and useful composition of matter to be used for the removal of scales and incrustations in steam-boilers, tanks, pipes, or wherever scales or incrustations are formed by hot or boiling water or steam, (for which I have obtained no patent in this or any other country,) of which the following is a specification.

This invention relates to a method of treating water to be used for removing the incrustations or scales from the walls of steam-boilers, and in which method the following ingredients are combined in about the proportions stated—namely, wheat-straw, fifteen pounds; wheat-chaff, five pounds; pure thrashed wheat, four pounds. These ingredients are to be thoroughly mixed in a suitable vessel and in a dry state.

In using the above composition I fill a number of coffee or other pervious sacks with the composition, the number being regulated by the size of the boiler to be treated. I then place said sacks in the boiler before firing up, and allow the same to remain therein for about twenty-four hours, (more or less, according to the condition of the boiler;) but I find by experiment that in many cases a treatment of but a few hours will suffice to thoroughly remove the burned iron or incrustations from the boiler-walls. After allowing the sacks of composition to remain in the boiler the required time I shut down the boiler and remove the sacks and scales or incrustations therefrom. I then place a sufficient amount of the composition inclosed by a pervious sack in the feed-water tank of the boiler and allow the sack to remain therein indefinitely for the purpose of preventing the further formation of scale or mineral deposit on the boiler-wall.

In treating small boilers that will not admit of the introduction of the sacks I put the wheat in a tank and pour boiling water over it sufficient to submerge it and let it soak for two hours, (more or less,) and then fill in the wheat-straw and wheat-chaff in the proportions stated and weight the mixture down. I then fill the tank with water and let it stand, usually over night. I then draw off and strain the water and feed the same to the boiler for about one day. I then shut down and remove the incrustations from the boiler. This application renders the same service as the sacks of composition when placed in the boiler, and will be found equally effective.

I find by experience that after the above treatment it is well to feed about five gallons of the treated water to the boiler each day.

I have found by experience that when a sack of the composition is placed in the feed-water tank of a new boiler it will effectually clear the water of the mineral and other impurities, and thus prevent the formation of scales or incrustations upon the boiler-walls.

I select for the composition wheat-straw and wheat-chaff that have not been exposed to great rains.

I am aware that compressed chopped straw and oak sawdust have been used for the purpose of removing the incrustations from boiler-walls, and I am also aware that hay has been used as a filtering material; but I am not aware that the ingredients of my composition have ever been combined and used in the manner specified.

Having described my invention, what I claim is—

1. The method described of removing the incrustations from boiler-walls, consisting in placing sacks of wheat-straw, wheat-chaff, and thrashed wheat combined in the boiler before firing up and allowing the same to remain therein for twenty-four hours (more or less) after firing, and then shutting down the boiler and removing the sacks and scales or incrustations, and finally placing a sack of the composition in the feed-water tank of the boiler, substantially as specified.

2. The method described of removing the incrustations from boiler-walls, consisting, first, in putting wheat in a tank and pouring boiling water over the same and allowing it to soak two hours, (more or less,) then in filling in wheat-straw and wheat-chaff and weighting the mixture down, then filling the tank with water and letting it stand over night, then drawing off and straining the water, and finally feeding the treated water to the boiler for about one day, as set forth.

ERASTUS C. NOLAND.

Witnesses:
W. S. MOFFETT,
W. O. SIDENER.